US008228381B2

(12) United States Patent
Accurso

(10) Patent No.: US 8,228,381 B2
(45) Date of Patent: Jul. 24, 2012

(54) VIDEO AND DATA CAPTURING SYSTEM AND METHOD

(76) Inventor: Walter Accurso, Independence, MO (US)

( * ) Notice: Subject to any disclaimer, the term of this patent is extended or adjusted under 35 U.S.C. 154(b) by 520 days.

(21) Appl. No.: 12/552,975

(22) Filed: Sep. 2, 2009

(65) Prior Publication Data

US 2010/0053331 A1    Mar. 4, 2010

Related U.S. Application Data

(60) Provisional application No. 61/093,817, filed on Sep. 3, 2008.

(51) Int. Cl.
*H04N 7/18* (2006.01)
*H04N 5/30* (2006.01)
*H04N 5/33* (2006.01)
*H04N 5/225* (2006.01)
*G01S 15/89* (2006.01)

(52) U.S. Cl. ........ 348/157; 348/148; 348/149; 348/150; 348/151; 348/152; 348/153; 348/154; 348/155; 348/156; 348/158; 348/159; 348/160; 348/161; 348/162; 348/163; 348/164; 348/165; 348/166; 348/167; 348/168; 348/169

(58) Field of Classification Search ........... 348/148–169
See application file for complete search history.

(56) References Cited

U.S. PATENT DOCUMENTS

| 5,881,321 A | 3/1999 | Kivolowitz |
| 5,912,864 A | 6/1999 | Maurer |
| 5,978,972 A | 11/1999 | Stewart et al. |
| 6,191,405 B1 | 2/2001 | Mishima et al. |
| 6,582,330 B1 | 6/2003 | Rehkemper et al. |
| 7,273,431 B2 | 9/2007 | DeVall |
| 2006/0050982 A1 | 3/2006 | Grosvenor |
| 2006/0202997 A1 | 9/2006 | LaValley et al. |
| 2006/0204232 A1 | 9/2006 | Weinberg et al. |
| 2008/0300055 A1* | 12/2008 | Lutnick et al. .................. 463/39 |

FOREIGN PATENT DOCUMENTS

WO    WO-03/088147    10/2003

OTHER PUBLICATIONS

Allen, Roger "Would You Believe . . . ? Machine Vision Gets Smarter", (May 5, 2008),pp. 28-30.

* cited by examiner

*Primary Examiner* — Tonia L. M. Dollinger
*Assistant Examiner* — Clarence John
(74) *Attorney, Agent, or Firm* — Law Office of Mark Brown, LLC; Mark E. Brown

(57) ABSTRACT

A video and data capturing system and method includes a mobile unit having an image sensor and motion sensing equipment connected to a microprocessor. The mobile unit is installed in an object for detecting visual images and motion data associated with the object. The mobile unit communicates with a base unit capable of analyzing the image and motion data and correcting the image data so it is level with the horizon. A foot unit may be used in conjunction with the mobile unit for detection of an athlete's foot acceleration for determining when the athlete's foot comes in contact with the ground. A field unit may be used in conjunction with the mobile unit and foot unit to determine the location of the foot unit on a playing surface to assist in determining whether an athlete is in or out of bounds, or their location on the playing surface.

17 Claims, 7 Drawing Sheets

VIDEO AND DATA CAPTURING SYSTEM AND METHOD

CROSS-REFERENCE TO RELATED APPLICATION

This application claims the benefit of U.S. provisional patent application No. 61/093,817, filed Sep. 3, 2008, which is incorporated herein by reference.

BACKGROUND

1. Field of the Invention

The present invention relates generally to video camera image orientation equipment, and in particular to a video image capture, correction, and transmission system for use with an object that has an orientation with respect to its direction of travel.

2. Description of the Related Art

The use of video to capture information is accomplished for a variety of purposes. Information that has an informative or entertainment value may benefit from recording and re-transmission. Often the manner in which the information is captured and the vantage point is of particular interest. For example, competitive sporting activities are often televised for analysis and entertainment purposes. The environment and breadths of vantage points available to television viewers are ever increasing. Traditional vantage points include the perimeter and areas outside the competition area that are either in a static or moving relationship with respect to the competitors. Technology has advanced miniaturization and durability of video image capture and transmission equipment making it feasible to access vantage points not possible with traditional video equipment. Increasingly, viewers experience competitive sporting events from the perspective of players and from various vantage points within the competition area. Video equipment has been attached to helmets of football players and embedded in baseball diamonds providing a unique perspective of the game for television viewers.

Use of image capture devices in such dynamic environments is made possible by technology that provides stabilization of the image capture device relative to the optical axis. It is well known in the art that miniaturized accelerometers and gyroscopes can be used to compensate for movement of light collecting and image capture devices using circuitry to coordinate physical adjustment of such devices. Such technology allows for correction of aberrations generated by movement of the equipment vertically and horizontally with respect to the optical axis. A particular limitation of such technology as deployed is the ability to compensate for motion of the camera and transmission of a stable image when the equipment is rotated along the optical axis. Rotation of video equipment about the optical axis generates an image where the horizon does not remain level thereby creating an image that is difficult to look at. This limitation prevents video equipment from being deployed in environments where the vantage point is subject to rotation about the optical axis. What is needed is a video and data capturing system that can correct image deviations related to rotation about the optical axis using mechanical and image processing methods.

Heretofore there has not been available a video and data capturing and transmission system with the advantages and features of the present invention.

SUMMARY

In a practice of the present invention, a video and data capturing system is provided for capturing and correcting video image aberrations due to image sensor rotation about the optical axis. In one aspect of the invention, a mobile unit consisting of a pair of end-mounted cameras and motion sensing equipment are coupled with a microprocessor and installed in an object that has an orientation with respect to its direction of motion. The microprocessor uses data collected from the motion sensing equipment and the cameras mounted coaxially at each end of the object and computes corrections for aberrations of the video image created by rotation of the image sensor about the optical axis. Corrections are made to the video image using computer software either before the video image is wirelessly transmitted to a base unit, or after wireless reception of the image data and motion data by the base unit.

In an alternative embodiment of the present invention, an enhanced video and data capturing system operates in conjunction with an enhanced mobile unit, an enhanced base unit, a foot unit, and a surface unit to capture and transmit video images, and motion data. The enhanced mobile unit incorporates a clock for generating a time code in sync with a clock within the enhanced base unit. The time code permits syncing of the image at the enhanced base unit after transmission by the enhanced mobile unit. Further, the enhanced mobile unit detects the acceleration, speed, and rotation of the mobile unit, and transmits the data to the enhanced base unit.

A foot unit is embedded within a shoe worn by an athlete on a playing surface and has a sensor that detects the acceleration of the shoe for determining when an athlete's foot comes in contact with the playing surface. The foot unit transmits the acceleration data in conjunction with a time code to the enhanced mobile unit for retransmission to the base unit. Such data is used in conjunction with a surface unit to determine the athlete's shoe location on a playing surface such as in or out of bounds, or in relation to a field surface marking. The field unit has numerous proximity sensors embedded within the playing surface for detecting the presence and location of an athlete's shoe. The proximity data is transmitted to the enhanced base unit providing game officials with additional information for determining the location of players on the playing surface and the placement of the object therein.

BRIEF DESCRIPTION OF THE DRAWINGS

The drawings constitute a part of this specification and include exemplary embodiments of the present invention and illustrate various objects and features thereof.

DETAILED DESCRIPTION

I. Introduction and Environment

As required, detailed aspects of the present invention are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Embodiment or Aspect Video and Data Capturing System 2

Figure 1:
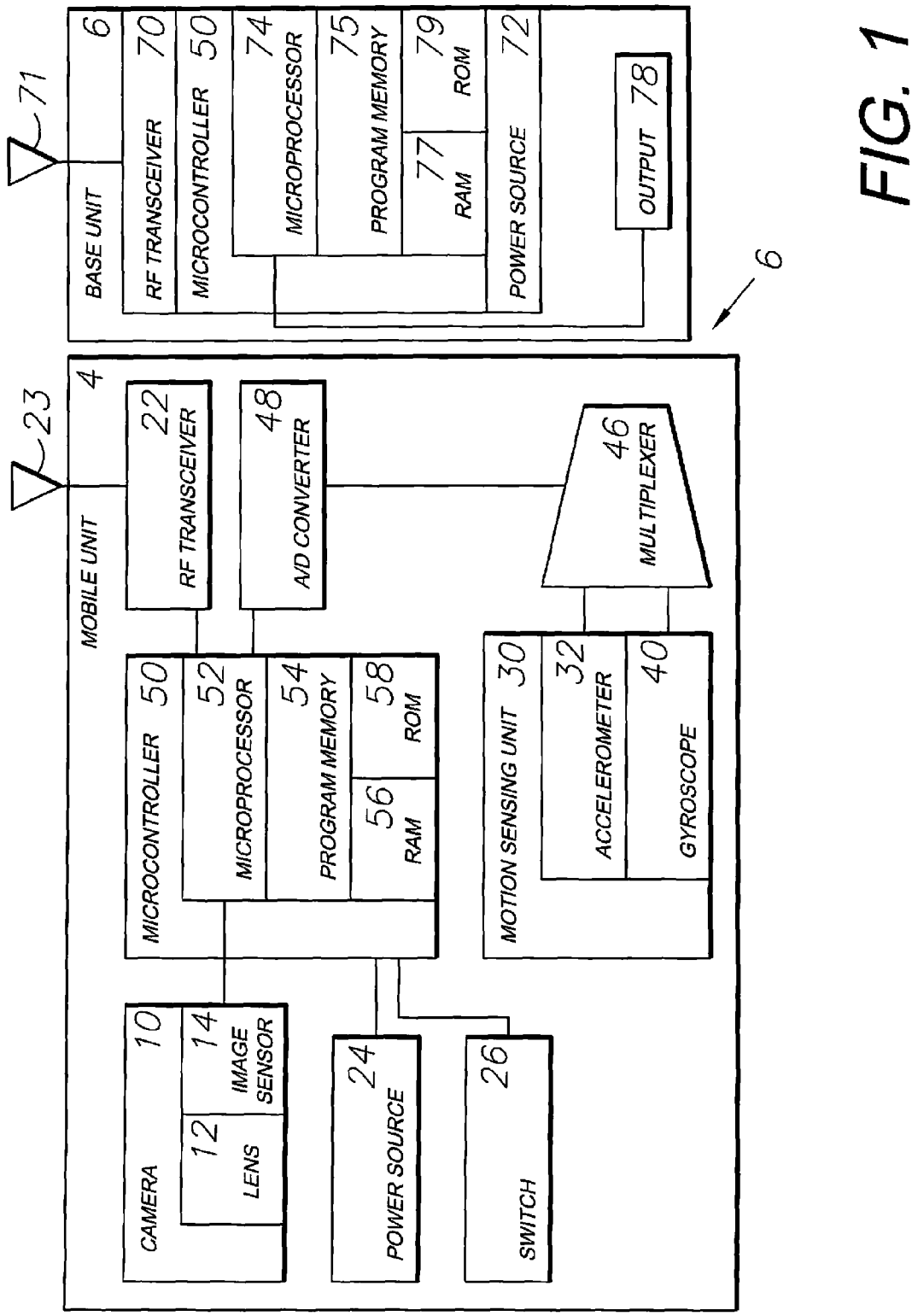
FIG. 1 is a block diagram of a video and data capturing system embodying the present invention.

Referring to the drawings in more detail, the reference numeral 2 generally designates a video and data capturing system embodying the present invention. FIG. 1 shows a system 2 that generally includes a mobile unit 4 for detecting visual images and for transmission to a base unit 6. The mobile unit 4 includes: one or more cameras 10 having a lens 12 and an image sensor 14 for gathering visual information; a radio frequency (RF) transceiver 22; a power source 24; a manual and/or remote control switch 26; a motion sensing unit 30 for detecting orientation of the mobile unit 4; and a microcontroller 50.

Electromagnetic radiation in the form of visible light enters the lens 12 of the camera 10 and is directed to the image sensor 14. The image sensor 14 converts the light to image signals for processing by the microprocessor 52. The image sensor 14 can comprise, for example, a charge-coupled device (CCD) or a complementary metal-oxide-semiconductor (CMOS) active-pixel sensor, although in the embodiments shown, the image sensor 14 is preferably a CCD.

The motion sensing unit 30 provides detection of motion in six degrees of freedom utilizing an appropriate number of accelerometers 32 and gyroscopes 40. For example, six accelerometers 32 can be used to detect movement of the mobile unit 4 with respect to the earth. Preferably, at least two accelerometers 32 per axis capable of detecting yaw, pitch, and roll about the Z, X and Y axes (FIG. 2) respectively are installed orthogonal to one another with respect to the image sensor 14. Yaw corresponds to rotation of the mobile unit 4 about the Z axis. Pitch corresponds to rotation of the mobile unit 4 about the x-axis. Roll corresponds to rotation of the mobile unit 4 about the y-axis. In this particular embodiment, the optical axis 112 (FIG. 2) of the mobile unit 4 is aligned with the y-axis. The yaw, pitch, and roll of the mobile unit 4 are detected by the accelerometers 32. The accelerometers 32 generate acceleration signals that are input into the microprocessor 52. Two gyroscopes 40 capable of detecting angular rotation of the mobile unit 4 are installed orthogonal to one another with respect to the image sensor 14. The angular rotation of the mobile unit 4 is detected by the gyroscopes 40 and gyroscopic signals are input into the microprocessor 52. The acceleration signals and gyroscopic signals are combined by a multiplexer 46 to generate motion signals that are quantized by an analog-to-digital (A/D) converter 48 and analyzed and interpreted by the microprocessor 52.

The microcontroller 50 includes a programmable microprocessor 52 and can include various components, such as input and output devices, and program memory 54. The microprocessor 52 processes the image data from the image sensor 14, and motion data detected by the motion sensing unit 30, to determine image correction. Image correction stabilizes the image motion relative to roll of the image sensor 14 about the optical axis 112 (FIG. 2) thereby creating an image that remains generally parallel with respect to the horizon. Image correction is accomplished either in real time by the microprocessor 52 during object flight as corrections are warranted, or at a later time by the base unit 6. The microprocessor 52 may comprise any conventional processor device known in the art. The processor 52 runs on software stored and operated within the program memory 54 which consists of random-access memory (RAM) 56 and read-only memory (ROM) 58. Software stored within the program memory 54 may include, but is not limited to, image correction software.

A power source 24 provides power to the microcontroller 50 for powering the mobile unit 4. The power source 24 can comprise electrochemical cells, including, but not limited to nickel cadmium, nickel metal hydride, lithium ion, lithium ion polymer, lithium sulfur dioxide, an ultrahigh capacity capacitor or a fuel cell. The RF transceiver 22 in the mobile unit 4 receives, via an antenna 23, on and off power settings, and reset and adjustment commands transmitted from the base unit 6, and transmits data signals consisting of a corrected or uncorrected visual image to the RF transceiver 70 in the base unit 6 via an antenna 71 either continuously or at predetermined intervals. A switch 26 can be incorporated in the microcontroller 50 for activation by transmitted signals. Alternatively, various other types of switches can be provided, including, but not limited to a manual switch, keypad, and motion sensing.

The base unit 6 comprises an RF transceiver 70, and a microcontroller 73 having a microprocessor 74 and program memory 75. The microprocessor 74 runs on software stored and operated within the program memory 75 which consists of RAM 77 and ROM 79. Software stored within the program memory 75 may include, but is not limited to, video editing software. The microprocessor 74 processes the data received by the RF transceiver 70, and using the video editing software creates output 78 consisting of, but not limited to, image retransmission, or recording. A power source 72 provides power to the base unit 6, and can comprise batteries or a direct electrical connection.

Figure 2:
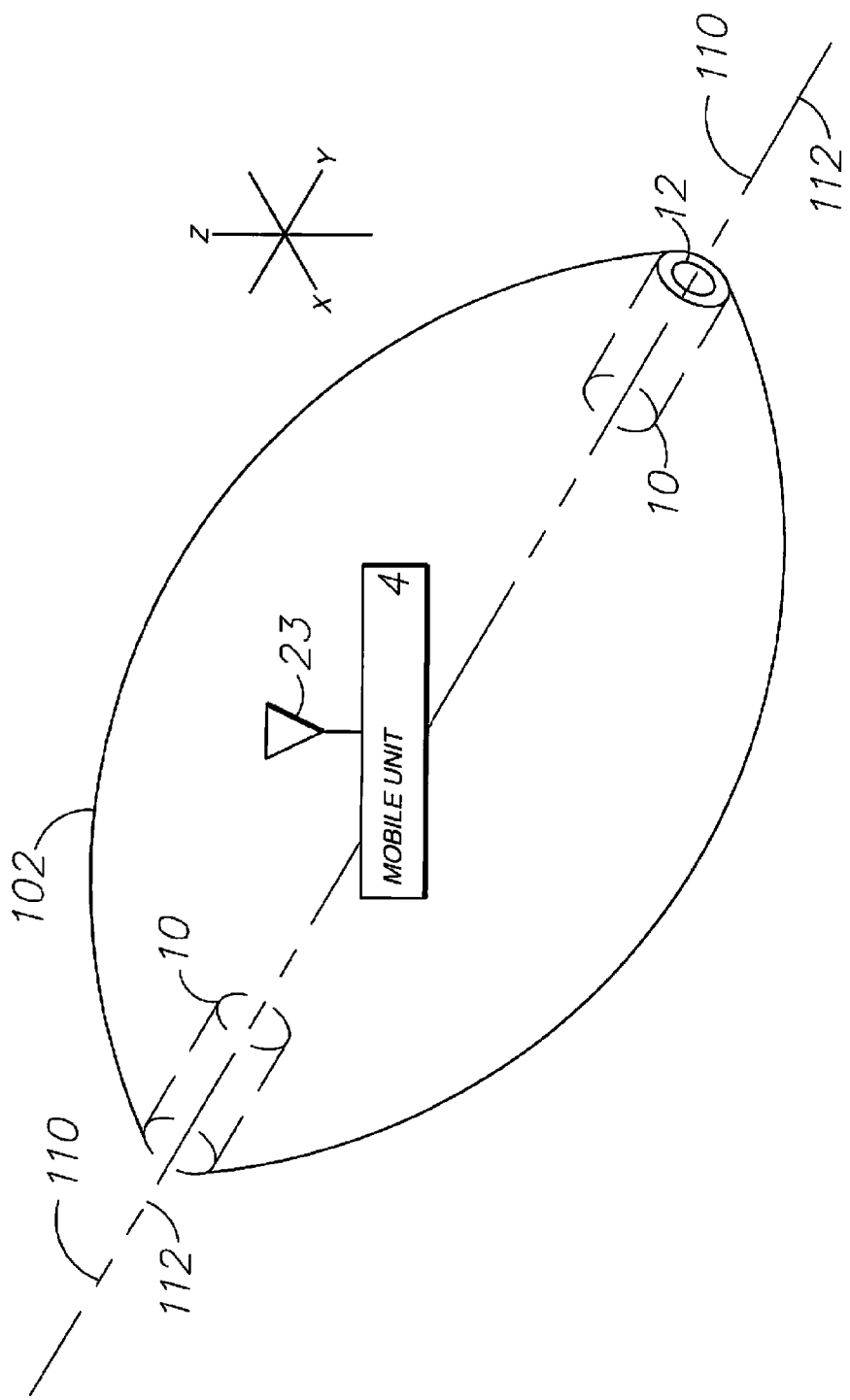
FIG. 2 shows the video and data capturing system installed in an American football.
Figure 3:
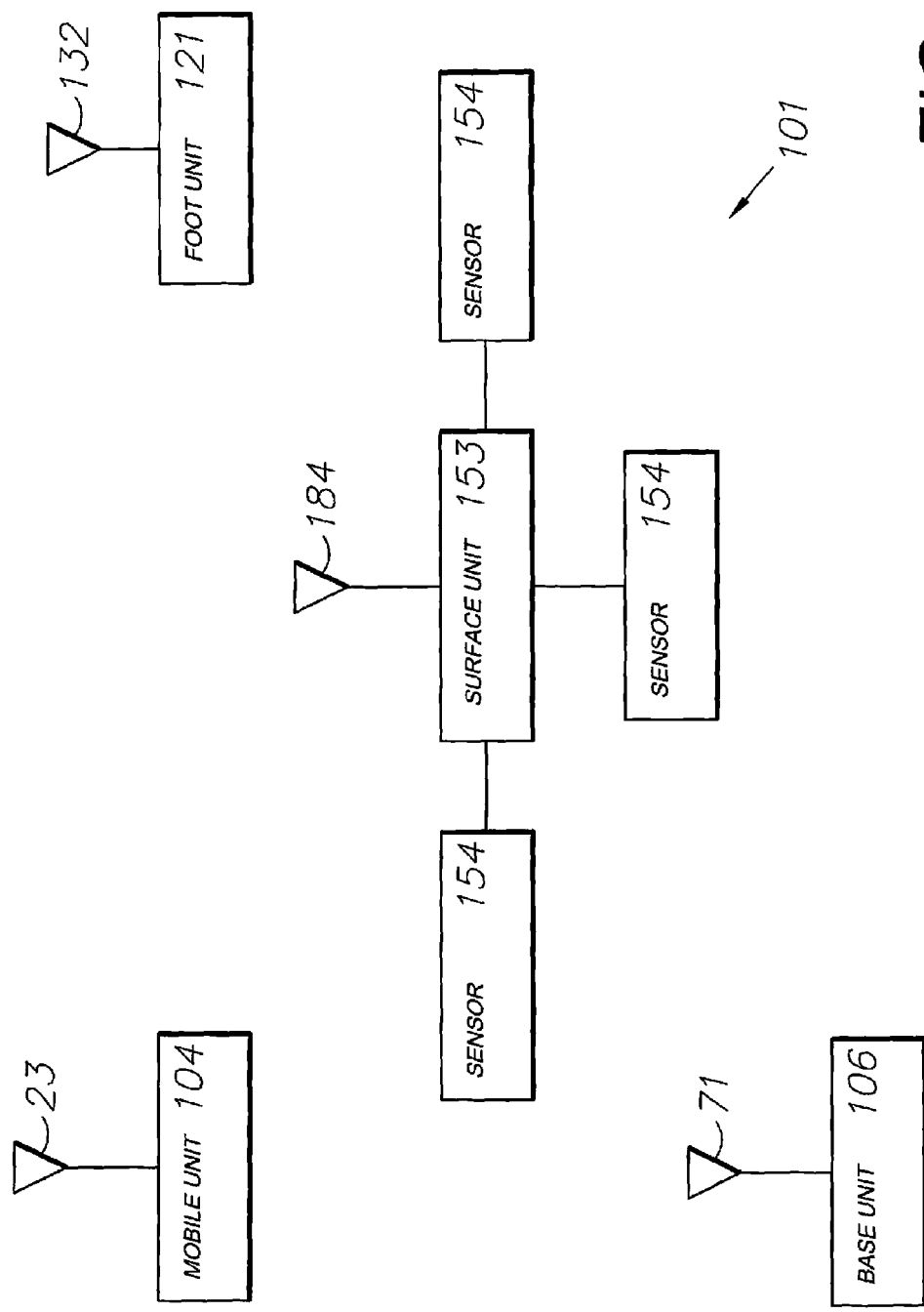
FIG. 3 shows a block diagram of an alternative embodiment video and data capturing system embodying the present invention.
Figure 4:
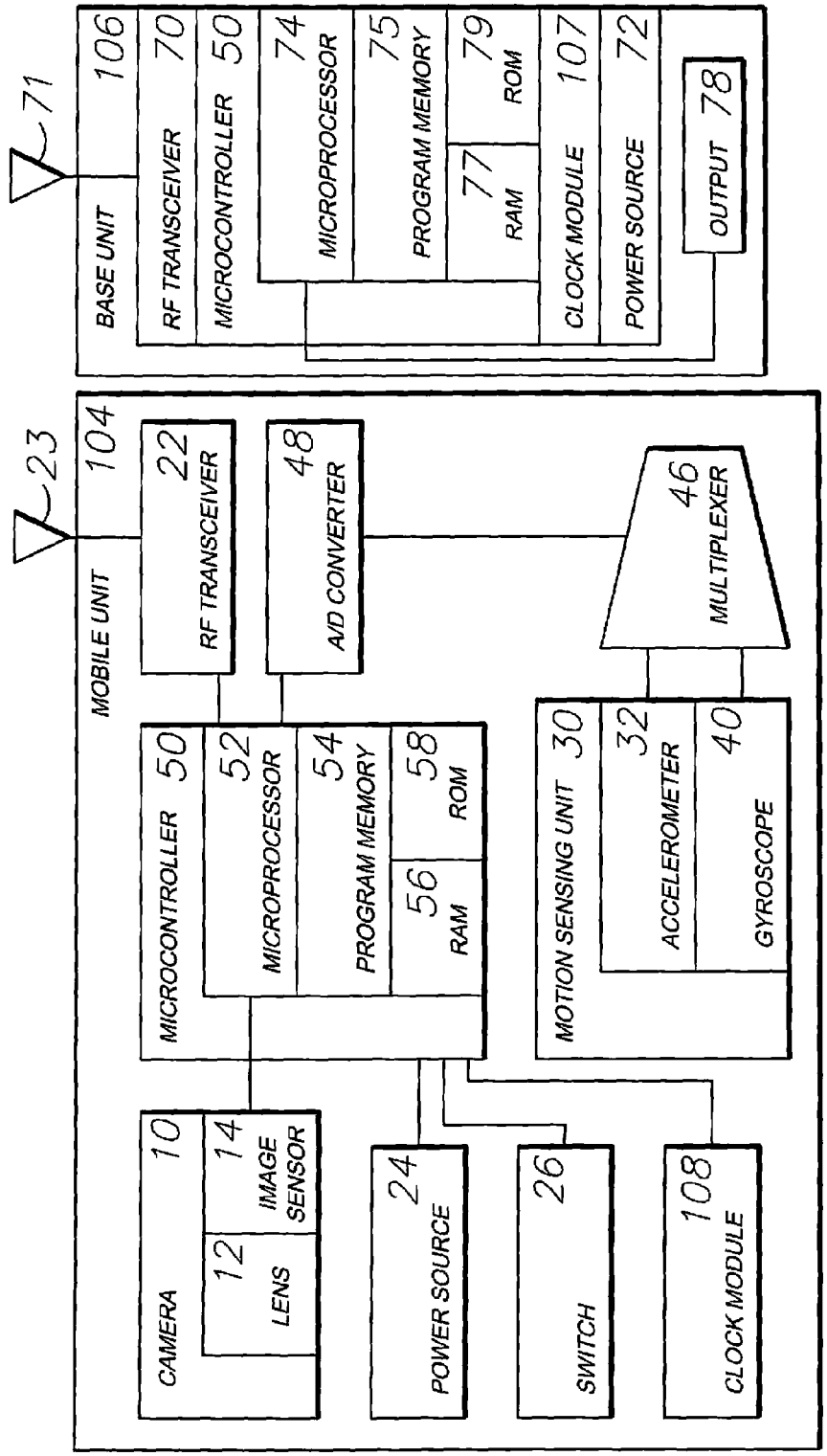
FIG. 4 shows an enhanced mobile unit and enhanced base unit embodying principles of the present invention.

FIG. 2 shows the mobile unit 4 installed in an object 102. The object 102 may be any object capable of receiving a mobile unit 4 including, but not limited to a sphere (e.g., a soccer ball, volley ball, basketball, baseball, softball, etc.) a projectile, a spheroid, a prolate spheroid (e.g., American football, Canadian football, or rugby football), hockey puck, or shuttlecock. The object 102 shown is an American football. The cameras 10 may be located with their lenses in each of the first and second ends of the object 102 along a longitudinal axis 110 of the object 102 thereby enabling image capture from more than one perspective. Alternatively, the cameras 10 may be orientated radially from a center point. In the exemplar embodiment, the mobile unit 4 is positioned in the object 102 as required by the construction of the object 102 whereby the optical axes 112 of the cameras 10 are aligned with the longitudinal axis 110 of the object 102.

Often the object 102 in which the mobile unit 4 is installed must conform to a minimum and maximum weight. Integration of the mobile unit 4 with the object 102 takes into consideration several approaches for meeting weight parameters, such as selecting lightweight components for the mobile unit 4, and otherwise weight-controlling the object 102.

III. Alternative Embodiment Video and Data Capturing System 101

A video and data capture system 101 comprising another embodiment or aspect of the disclosed subject matter is shown in FIGS. 3-7, and includes an enhanced base unit 106 operating in conjunction with an enhanced mobile unit 104, a foot unit 121, and a surface unit 153. The enhanced mobile unit 104 is similar to the mobile unit 4 described above with the addition of a clock module 108 that is operably connected to the microcontroller 50 for encoding a time code with the electrical signals generated by the image sensor 14 and the motion data generated by the motion sensing unit 30. The enhanced base unit 106 is similar to the base unit 6 described above with the addition of a clock module 107 that is in sync with the clock 108 in the mobile unit 104. The clock module 107 is operably connected to the microprocessor 74 for keeping image data and motion data transmitted by the mobile unit 104 synchronized. The time codes generated by the clock modules 107, 108 facilitate image correction in the mobile unit 104 and the base unit 106 caused by rotation of the image sensors 14 about the optical axis 112. Image correction can be performed on the image signals by the base unit 106 to generate output 78 including, but not limited to, an image that is level relative to the horizon.

In addition to providing motion data information for correction of image signals, the data generated by the motion sensing unit 30 can be used to interpret the acceleration and speed of the mobile unit 104, and rotation of the mobile unit 104 about the longitudinal axis 110. The aforementioned motion data may be transmitted to the base unit 106 in conjunction with the visual image data or it may be transmitted independently of the visual image data.

Figure 5:
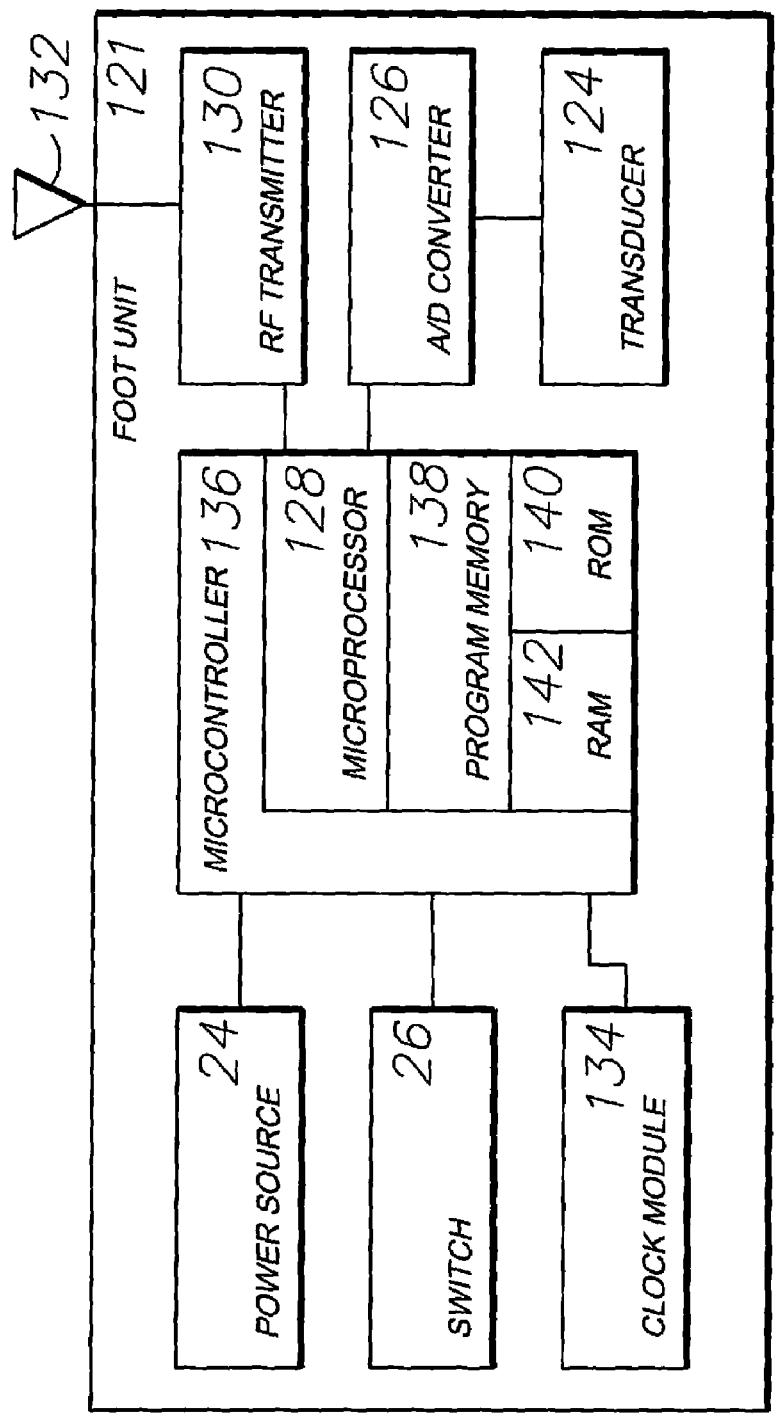
FIG. 5 shows a foot unit embodying principles of the present invention.

The mobile unit 104 and base unit 106 may be used in conjunction with a foot unit 121 that is embedded within a foot covering such as a shoe 122 worn on an athlete's 120 foot, and a playing surface 152 having a plurality of sensors 154 connected to a surface unit 153. Referring to FIG. 5, the foot unit 121 generally comprises a microcontroller 136 operably connected to an RF transmitter 130 and a transducer 124, preferably a piezoelectric sensor for measuring acceleration of the athlete's 120 foot as it comes into contact with the playing surface 152. The microcontroller 136 contains a microprocessor 128 that runs on software stored and operated within the program memory 138, which consists of RAM 142 and ROM 140. The transducer 124 is operably connected to the microprocessor 128 by an A/D converter 126, and generates an acceleration signal corresponding to the impact force generated when the athlete's 120 foot comes into contact with the playing surface 152. The acceleration signal is converted by an A/D converter 126 which quantizes the signal for interpretation by a microprocessor 128. A clock module 134 is operably connected to the microprocessor 128 in sync with the clock module 108 in the mobile unit 104 and generates time codes for synchronizing the acceleration signal with the image signals generated by the image sensor 14 and the motion data generated by the motion sensing unit 30. The microprocessor 128 processes the signal, and an RF transceiver 130 transmits the acceleration signal to the mobile unit 104, or the base unit 106 via an antenna 132.

Figure 6:
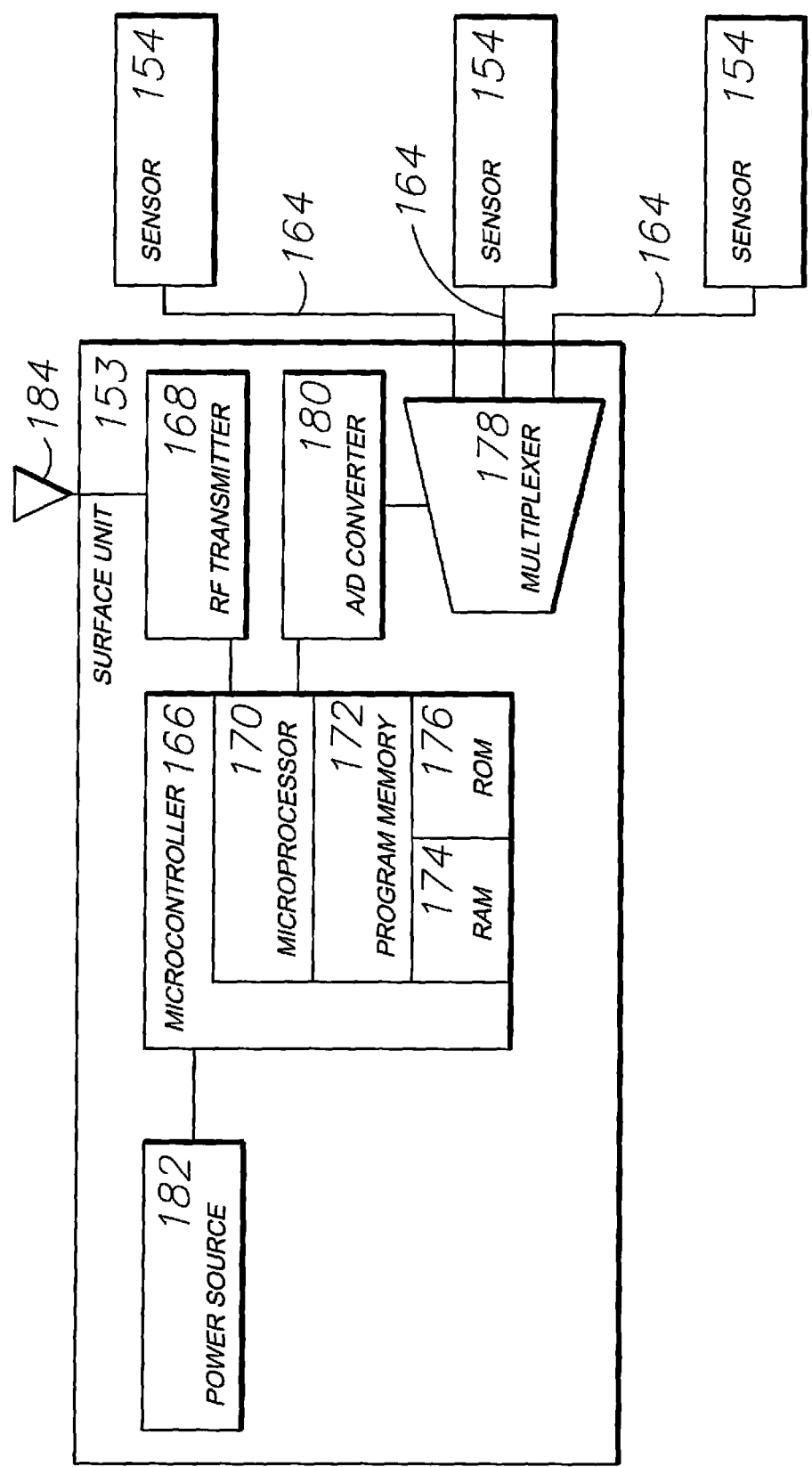
FIG. 6 shows a surface unit embodying principles of the present invention.

Referring to FIG. 6, the surface unit 153 generally comprises a microcontroller 166 operably connected to an RF transmitter 168 and a plurality of sensors 154. The sensors 154, such as proximity sensors, detect the presence of a player's 120 shoe 122 on the playing surface 152 and generate proximity signals. The microcontroller contains a microprocessor 170 that runs on software stored and operated within the program memory 172, which includes RAM 174 and ROM 176. The proximity signals from the sensors 154 are combined by a multiplexer 178 that regulates input for an A/D converter 180 which quantizes the signals for interpretation by the microprocessor 170. A power source 182 provides power to the surface unit 153, and can comprise batteries or a direct electrical connection. An RF transmitter 168 transmits the proximity signal to the base unit 106 via an antenna 184.

Figure 7:
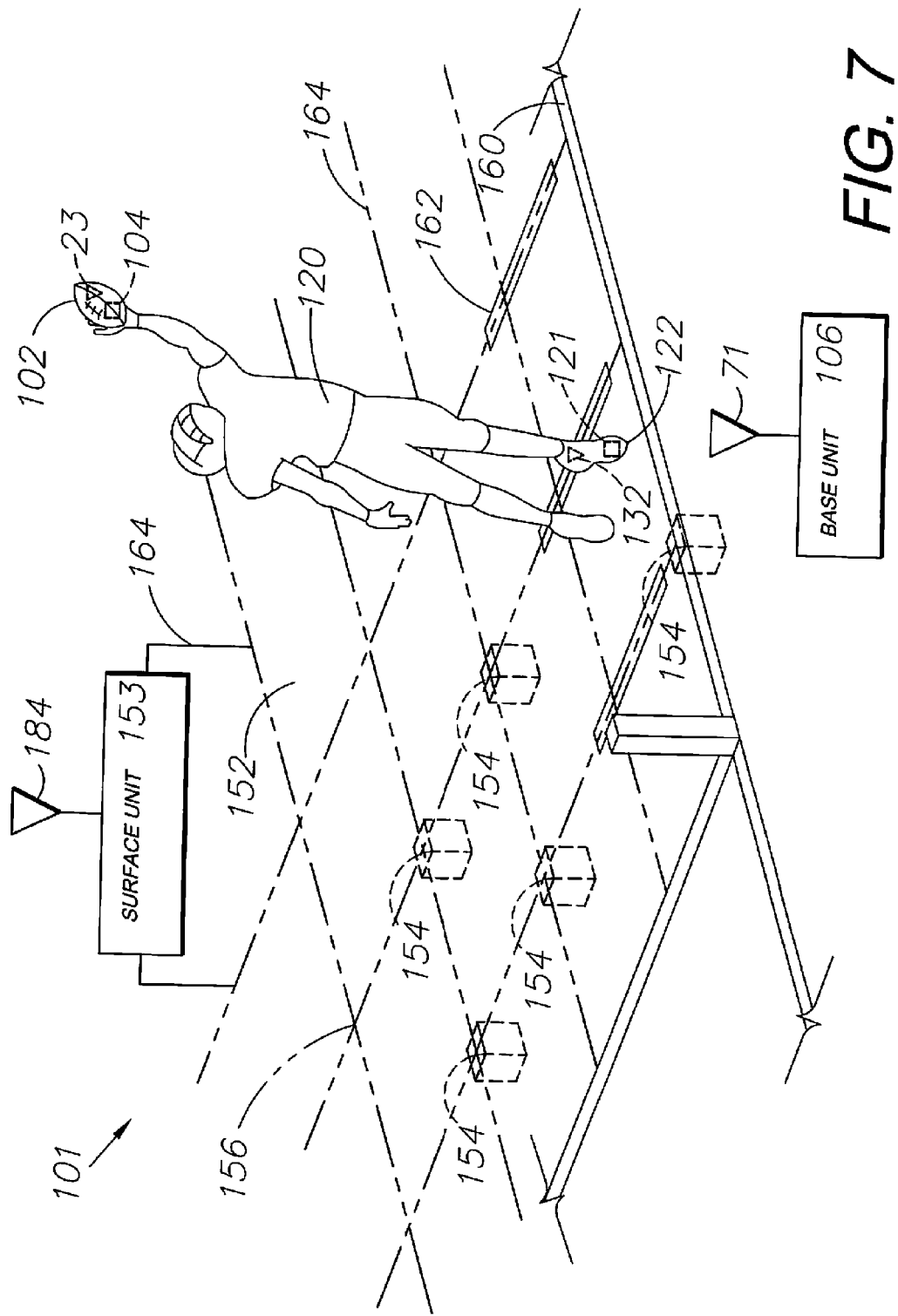
FIG. 7 shows the alternative embodiment video and data capturing system in use in conjunction with footwear and a playing surface.

Referring to FIG. 7, a playing surface 152 is shown and described. The playing surface 152 may consist of an athletic surface capable of receiving a plurality of sensors 154 therein, including, but not limited to natural grass, synthetic grass, a resilient surface such as rubber, or a hard surface such as pavement. The sensors 154 are arranged in a grid formation 156 and are connected by wires 164 to the surface unit 153. The sensors 154 detect the presence and location of the shoe 122 on the playing surface 152, and determine the proximity of the shoe 122 to a boundary line 160, such as the perimeter of the playing surface 152, or proximity to a field line 162.

In operation of the system 101, an athlete 120 wearing one or more shoes 122 containing a foot unit 121 is present on a playing surface 152 containing sensors 154. Any and all athletes 120 present on a playing surface 152 may have one or more shoes 122 containing a foot unit 121. The object 102 is shown being caught by an athlete 120 after being thrown by another athlete (not shown). As the object 102 is thrown, data consisting of image data, and acceleration and speed of the mobile unit 104 is gathered, processed, and transmitted to the base unit 106. During flight, the mobile unit 104 and object 102 rotate about the optical axis 112 receiving image signals generated by the image sensors 14 and motion data generated by the motion sensing unit 30. The data is gathered, processed, and transmitted from the mobile unit 104 to the base unit 106 for analysis and re-transmission or recording. When the shoe 122 is within range of the mobile unit 104, the sensors 154 detect the location of the shoe 122 on the playing surface 152 and transmit a proximity signal to the mobile unit 104 which relays the signal to the base unit 106. As the football 102 is caught by the athlete 120 wearing a shoe 122, the deceleration of the shoe 122 is measured by the transducer 124 and the deceleration of the object 102 is measured by the motion sensing unit 30. The data generated by the transducer 124 and the motion sensing unit 30 are transmitted to the mobile unit 104 and then sent to the base unit 106. The sensors 154 detect the RF signal from the foot unit 121 and by triangulation generate a proximity signal used to determine the location of the foot unit 121 on the playing surface 152. The proximity signal can be used independently or in conjunction with the shoe 122 acceleration signal to determine the location of the shoe 122 with respect to a boundary line 160 or a field line 162. Such data may be useful to a game official for officiating a game, whether an athlete 120 is in or out of the playing surface 152 boundary 160, and to determine placement of the object 102 after play has ceased according to the rules of the game. Additionally, the image signal generated by the image sensor 14 in the mobile unit 104 in conjunction with the proximity signal from the surface unit 153 and the acceleration signal from the foot unit 121 may assist an official in making a determination as to the location of the object 102 on the playing surface 152.

It will be appreciated that the components of the systems 2 and 101 can be used for various other applications and can be employed in various objects without hindering or otherwise affecting the purpose or performance of the object. Moreover, the systems 2 and 101 can be fabricated in various sizes and from a wide range of suitable materials, using various manufacturing and fabrication techniques.

It is to be understood that while certain aspects of the invention have been shown and described, the invention is not limited thereto and encompasses various other embodiments and aspects.

Having thus described the invention, what is claimed as new and desired to be secured by Letters Patent is:

1. An apparatus for capturing images, comprising: a mobile unit including a mobile unit microcontroller; a ball including an image sensor having an optical axis, and adapted for generating an image signal, said image sensor operably connected to said mobile unit microcontroller; a motion sensing unit including a motion sensor for generating a motion signal indicative of movement of said image sensor, said motion sensor operably connected to said mobile unit microcontroller; said mobile unit microcontroller including a computer readable medium storing said image signal and said motion signal; said mobile unit computer readable medium further including image correction software stored on said computer readable medium for correcting said image signal; said mobile unit microcontroller including a microprocessor for processing said image signals and said motion signals, said mobile unit microcontroller generating an output signal comprising said motion signal and said image signal; a radio frequency (RF) transmitter operably connected to said mobile unit microcontroller, said RF transmitter adapted for transmitting said output signal to said base unit; a base unit including a base unit microcontroller; an RF receiver operably connected to said base unit microcontroller, said RF receiver adapted for receiving said mobile unit output signal; said base unit microcontroller including a computer readable medium storing video editing software and said mobile unit output signal, said base unit microcontroller including a microprocessor for processing said mobile unit output signal; and said base unit microcontroller generating an output signal comprising a visually perceptible image of said image signal.

2. The apparatus of claim 1 wherein said motion sensor further comprises an accelerometer for sensing acceleration of said mobile unit, and a gyroscope for sensing angular rotation of said mobile unit.

3. The apparatus of claim 1 wherein said motion sensor further comprises three accelerometers for sensing acceleration of said mobile unit, and a gyroscope for sensing angular rotation of said mobile unit.

4. The apparatus of claim 1, which includes: said mobile unit microcontroller analyzing said image signal and said motion signal, and correcting said image signal rotation about said optical axis; and said output signal comprising an image signal corrected for rotation about said optical axis.

5. The apparatus of claim 1, further comprising:
a switch operably connected to said mobile unit microcontroller for powering said mobile unit on and off;
said base unit RF receiver comprising an RF transceiver for transmitting an adjustment command to said mobile unit;
said mobile unit RF transmitter comprising an RF transceiver for receiving said adjustment command; and
said adjustment command including a mobile unit on and off power command, and a mobile unit microcontroller reset command.

6. The apparatus of claim 5, further comprising:
an object;
said mobile unit disposed within said object; and
a power source operably connected to said mobile unit microcontroller for powering said mobile unit.

7. The apparatus of claim 6 wherein said object is a prolate spheroid.

8. An apparatus for capturing images, comprising: a mobile unit including a mobile unit microcontroller; a mobile clock module operably connected to said mobile unit microcontroller, said clock module generating a reference time code; an image sensor in a ball having an optical axis, and adapted for generating an image signal, said image sensor operably connected to said mobile unit microcontroller; a motion sensing unit including a motion sensor for generating a motion signal indicative of movement of said image sensor, said motion sensor operably connected to said mobile unit microcontroller; said mobile unit microcontroller including a computer readable medium storing said image signal, said motion signal, and said reference time code; said mobile unit computer readable medium further including image correction software stored on said computer readable medium for correcting said image signal; said mobile unit microcontroller including a microprocessor for processing said image signals and said motion signals, said mobile unit microcontroller generating an output signal comprising said motion signal and said image signal; a radio frequency (RF) transceiver operably connected to said mobile unit microcontroller, said RF transceiver adapted for transmitting said output signal and said reference time code to said base unit; a base unit including a base unit microcontroller; an RF transceiver operably connected to said base unit microcontroller, said RF transceiver adapted for receiving said mobile unit output signal and said reference time code; a base unit clock module operably connected to said base unit microcontroller, said clock module generating a base time code in sync with said reference time code; said base unit microcontroller including a computer readable medium storing video editing software and said mobile unit output signal; said base unit microcontroller including a microprocessor for processing said mobile unit output signal, said reference time code, and said base time code; said base unit microprocessor synchronizing said mobile unit output signal based on said reference time code and said base time code; and said base unit microcontroller generating an output signal comprising a visually perceptible image of said image signal.

9. The apparatus of claim 8, further comprising:
a foot unit including a foot unit microcontroller;
a transducer operably connected to said foot unit microcontroller, said transducer adapted for generating an acceleration signal;
a clock module operably connected to said foot unit microcontroller, said clock module generating a foot unit time code in sync with said reference time code;
said foot unit microcontroller including a computer readable medium storing said acceleration signal and said foot unit time code signal;
said foot unit microcontroller including a microprocessor for processing said acceleration signal and said foot unit time code;
said foot unit microcontroller generating an output signal comprising said acceleration signal and said foot unit time code signal;
an RF transmitter operably connected to said foot unit microcontroller, said RF transmitter adapted for transmitting said acceleration signal and said foot unit time code to said foot unit;
said mobile unit RF transceiver adapted for receiving said acceleration signal and said foot unit time code;
said mobile unit RF transceiver transmitting said acceleration signal and said foot unit time code to said base unit; and said base unit RF transceiver adapted for receiving said acceleration signal and said foot unit time code.

10. The apparatus of claim 9, further comprising:
a shoe; and
said foot unit located in said shoe.

11. The apparatus of claim 8, further comprising:
a surface unit including a surface unit microcontroller;
a proximity sensor operably connected to said surface unit microcontroller, said proximity sensor adapted for generating a proximity signal corresponding to the distance of said foot unit from said proximity sensor;
said surface unit microcontroller including a computer readable medium storing said proximity signal;
said surface unit microcontroller including a microprocessor for processing said proximity signal, said surface unit microcontroller generating an output signal comprising said proximity signal;
an RF transmitter operably connected to said surface unit microcontroller, said RF transmitter adapted for transmitting said proximity signal to said base unit; and
said base unit RF transceiver adapted for receiving said surface unit output signal.

12. The apparatus of claim 11, further comprising:
a playing surface; and
said proximity sensor disposed on said playing surface.

13. A method of video and data capturing, which comprises: providing an object with a mobile unit microcontroller having program memory; providing an image sensor in a ball; detecting an image with the image sensor having rotation with the image sensor; generating an image signal with the image sensor; providing a motion sensor; detecting motion of the image sensor with the motion sensor; generating a motion signal with the image sensor; storing the image signal and the motion signal on the mobile unit program memory; analyzing the image signal and the motion signal; editing the image signal using image correction software for creating a corrected signal; generating an output signal comprising the corrected image signal and the motion signal; providing a base unit microcontroller having program memory; transmitting the mobile unit output signal to the base unit; receiving the mobile unit output signal at the base unit; storing the mobile unit output signal on the base unit program memory; analyzing the mobile unit output signal at the base unit; providing image correction software at the base unit; correcting the rotation of the mobile unit image signal; and generating a base unit output signal comprising a visually perceptible image corrected for rotation.

14. The method according to claim 13, which includes the additional steps of:
detecting the acceleration of the image sensor with the motion sensor; and
detecting the angular rotation of the image sensor with the motion sensor.

15. The method according to claim 14, which includes the additional steps of:
providing the mobile unit with a clock module;
generating a reference time code from the mobile unit clock module;
providing a shoe with a foot unit microcontroller having program memory;
providing the microcontroller with a transducer and a clock module;
detecting acceleration of the shoe with the transducer;
generating an acceleration signal with the transducer;
generating a foot unit time code in sync with the mobile unit reference code;
storing the acceleration signal and foot unit time code on the foot unit program memory;
transmitting the foot unit acceleration signal and foot unit time code to the mobile unit;
receiving the foot unit acceleration signal and foot unit time code at the mobile unit;
transmitting the foot unit acceleration signal and foot unit time code from the mobile unit to the base unit; and
receiving the acceleration signal and foot unit time code at the base unit.

16. The method according to claim 15, which includes the additional steps of:
providing a playing surface with a surface unit microcontroller having program memory;
providing the playing surface with a proximity sensor;
detecting the proximity of the shoe to the proximity sensor;
generating a proximity signal with the proximity sensor corresponding to the proximity of the shoe to the proximity sensor;
storing the proximity signal on the surface unit program memory;
processing the proximity signal;
transmitting the proximity signal to the base unit;
receiving the proximity signal at the mobile unit;
analyzing the acceleration signal, foot unit time code, and proximity signal at the mobile unit; and
determining the location of the shoe on the playing surface.

17. The method according to claim 16, which includes the additional steps of:
providing the playing surface with field lines and boundary lines; and
positioning the proximity sensors within the boundary lines and field lines.

* * * * *